July 8, 1969     G. J. DIEDEREN     3,453,742
APPARATUS FOR DRYING PRINTING INK ON PLASTIC FILM
Original Filed Jan. 8, 1963
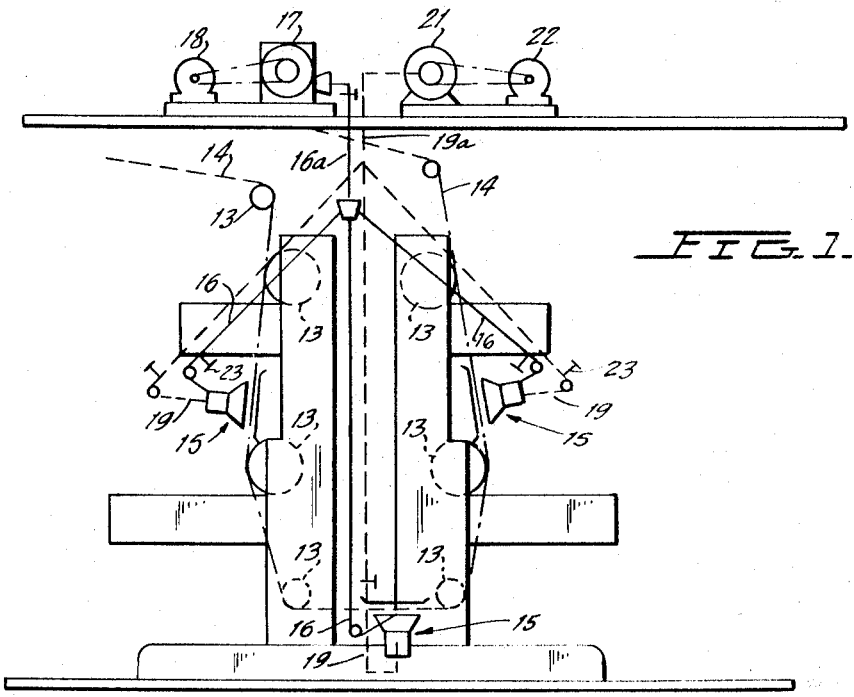
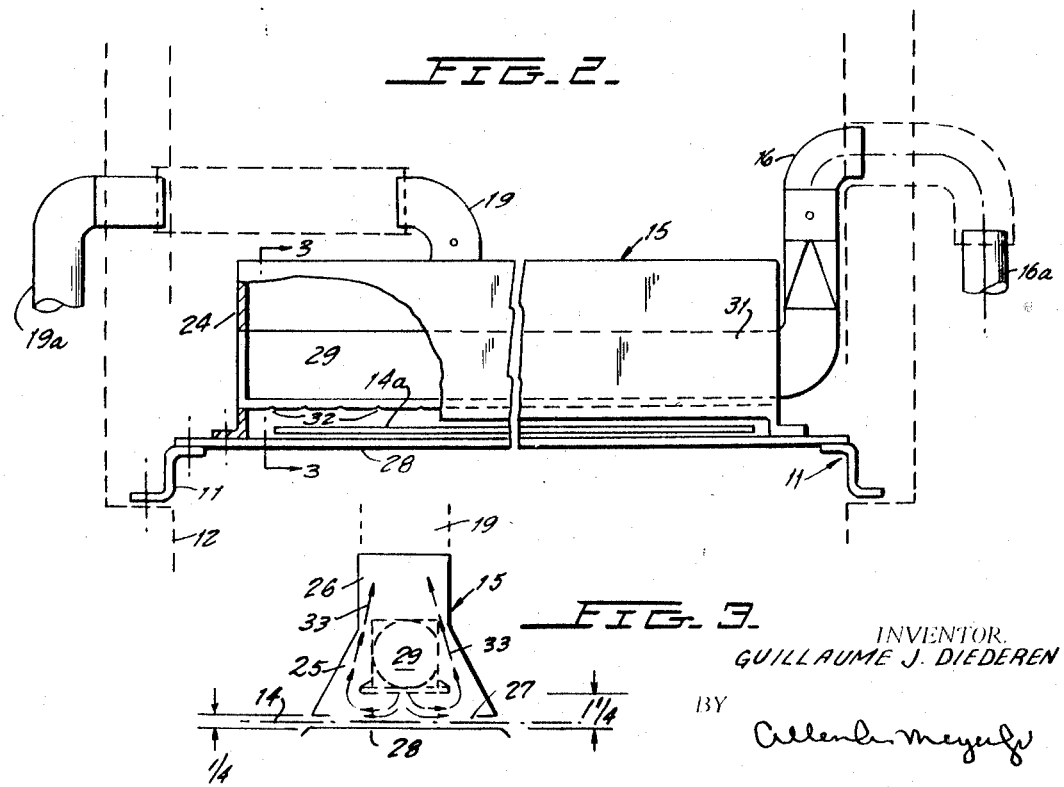
INVENTOR.
GUILLAUME J. DIEDEREN

United States Patent Office 3,453,742
Patented July 8, 1969

3,453,742
APPARATUS FOR DRYING PRINTING INK ON PLASTIC FILM
Guillaume Jan Diederen, Fairport, N.Y., assignor to National Distillers and Chemical Corporation, New York, N.Y., a corporation of Virginia
Original application Jan. 8, 1963, Ser. No. 250,101. Divided and this application Sept. 26, 1967, Ser. No. 699,748
Int. Cl. F26b 13/06
U.S. Cl. 34—155                                    1 Claim

ABSTRACT OF THE DISCLOSURE

Apparatus for drying printing inks on plastic film comprising a housing having a side open to the film feed path and an exhaust conduit opposite the open side. An air distribution conduit is disposed lengthwise in the housing and has a plurality of apertures facing the open side.

---

This application is a division of copending application Ser. No. 250,101, filed Jan. 8, 1963, now abandoned, in the name of Guillaume Jan Diederen, entitled Drying Printing Inks on Thermoplastic Films, and assigned to the assignee of the present invention.

This invention relates to a process and apparatus for drying printing inks on thermoplastic films. More particularly, it relates to such a process and apparatus useful for drying polyolefin films imprinted with one or more printing inks, without blurring the individual inks or adversely interfering with the film properties.

It is known to dry rapidly moving printed thermoplastic films by exposing the traveling film webs to relatively high temperature, e.g., about 220° F. air streams. While polyolefin films, e.g., polyethylene and polypropylene films, melt below this temperature, such films are not melted by such a drying treatment due to the high rates of film travel commonly employed therein. Nevertheless, it has been found that such treatment inevitably produces stretching of thermoplastic films and undesirable wrinkling thereof. Moreover, removal of the volatile organic printing ink solvents from the films by the relatively high temperature heat lamps presents a significant fire hazard.

It is among the objects of the present invention to provide a process for drying thermoplastic films which have been imprinted with one or more printing inks, to dry the printed films without blurring the individual inks or wrinkling or stretching the films.

Another object of the invention is to provide such a process useful for the high speed drying of thermoplastic films, which is economical to practice and which does not produce substantial fire hazards with the common organic printing ink solvents employed.

An additional object of the invention is to provide an efficient and yet relatively simple apparatus for drying printing inks on traveling thermoplastic films by such a process.

Other objects and advantages of this invention will be apparent from the following description therefor.

In accordance with the present invention, a thermoplastic film, preferably a polyolefin film, is dried after imprinting one or more printing inks thereon, by longitudinally feeding the wet printed film at a rate of at least 100 feet per minute and up to 500 feet per minute and simultaneously drying the film during its travel by subjecting it to a current of air at the ambient room temperature, e.g., at about 70° F., the air current impinging on the moving film at a speed of at least about 10,000 feet per minute. It has been found that by drying the thermoplastic film in this manner, utilizing a relatively low temperature, high velocity air current, the printing ink is rapidly dried on the thermoplastic film without effecting stretching of the film or wrinkling thereof.

It is possible to increase the feed rates of the thermoplastic film, employing the present drying procedure, since the physical properties of the film are not deleteriously affected by such procedure and the film retains its initial tensile strength. A more economical method for producing printed thermoplastic films than was heretofore possible is thereby provided.

The method of this invention is particularly useful in the drying of tubed polyethylene webs utilized for the manufacture of plastic bags; in one manufacturing installation, it has been found that, employing the process and apparatus described in detail hereinafter, multicolored printed polyethylene bags can be produced with a saving of thousands of dollars annually.

For a fuller understanding of the nature and objects of this invention, reference is made to the following detailed description of a preferred device for carrying out the invention, taken in connection with the accompanying drawing in which:

FIGURE 1 is a schematic layout of an apparatus for drying a moving polyethylene web while it is still wet with printing ink;

FIGURE 2 is a schematic elevation, partially in section, of one of the dryers employed in the apparatus of FIGURE 1; and FIGURE 3 is a section through the dryer of FIGURE 2, viewed along the direction of the line 3—3 in FIGURE 2.

Referring to the drawing, the apparatus illustrated includes a supporting structure 11 secured to a printing press 12. A series of driven and idler rolls 13 are journaled on the press structure 12, for receiving a traveling polyethylene web 14. The web 14 is fed into the drying apparatus immediately after imprinting a desired image thereon, the web being rapidly fed at a speed of at least 100 feet per minute and preferably from 100 to 250 feet per minute. The web dried may be a single thickness film or, as illustrated at 14a in FIGURE 2, may previously have been tubed for the formation of multicolor printed polyethylene bags.

Suitably mounted on the supporting structure 12 are a number of dryers 15, three of which are shown in FIGURE 1. Each of the dryers is connected by a supply conduit 16, shown in solid line in FIGURE 1, with a manifold 16a supplied by an air supply fan 17. The fan 17 is suitably actuated, as by a motor 18, to provide a relatively high velocity flow of air into the respective dryers 15. The air is supplied at ambient room temperature, e.g., at about 65° to 70° F., to the dryers, and from there onto the web, at a speed of, for example, 10,000 feet per minute. It has been found that, when the air is supplied at such high speeds of flow, adequate drying of the rapidly moving polyethylene web is achieved without impairing the physical properties of the moving web.

Each of the dryers 15 is similarly connected by an exhaust conduit 19 to an exhaust manifold 19a, which is connected in turn to an exhaust fan 21. The exhaust fan 21 is suitably driven, as by a motor 22. It will be understood that, if desired, the same motor may be employed to actuate fans 18 and 21, utilizing a suitable gearing or other drive. The air flow in conduits 16 and 19 is additionally regulated by means of dampers 23 placed therein.

One of the dryers 15 is shown in detail in FIGURES 2 and 3 of the drawing. The dryer comprises a housing 24 having an open expanded lower section 25 which is trapezoidal in cross-section, and a closed upper section 26 which is rectangular in cross-section. The open side 27 of the housing 24 is positioned adjacent the path of travel of the polyethylene film 14 and a backing plate 28 is disposed lengthwise of the open side 27 spaced a small distance therefrom, e.g., about ¼ inch, to define a pathway for the film to be dried.

An air distribution conduit 29 is mounted within the housing 24 connected at one end 31 to the supply conduit 16 and at the other end to the housing wall. A number of spaced apertures 32 are provided in the conduit lengthwise of the housing 24 to facilitate the passage of air from the supply conduit 16 into direct contact with the polyethylene film 14 or tube 14a fed between the housing 24 and the backing plate 28. The distance between housing 29 and backing plate 28 is ¼ inch. The air exhaust conduit 19 is connected to the upper section 26 of housing 24, intermediate the length thereof.

Air introduced through supply conduit 16 is fed through the distribution conduit 29 into contact with the film 14 and is passed annularly out of the housing 24 through the exhaust conduit 19, as indicated by the arrows 33 in FIGURE 3. The air is thus rapidly forced into contact with the moving film and impinges directly thereon, effecting evaporation of any of the printing ink solvent remaining on the film. The air stream is then immediately swept out of the dryer 15, annularly of the conduit 29 into the exhaust conduit 19.

The drying apparatus of the invention, when utilized to subject rapidly moving thermoplastic films to high velocity, ambient temperature air currents effects rapid drying of printing inks in order that subsequent inks may be immediately applied thereafter. Moreover, the procedure described above permits effective drying of thermoplastic films traveling at speeds of up to and greater than 500 feet per minute without deleteriously affecting the physical properties, e.g., the tensile strength, of the film treated, and without introducing any substantial danger of ignition of the flammable ink solvents.

Since certain changes may be made in carrying out the above method and in the apparatus therefor without departing from the scope of the present invention, it is intended that all matter contained in the above description or shown in the accompanying drawing shall be interpreted as illustrative and not in a limiting sense.

What is claimed is:

1. An apparatus for drying printing inks on thermoplastic webs comprising an elongated housing situated lengthwise of the direction of travel of said web, said housing having one longitudinal side which is open and disposed adjacent the web travel path, a side opposite said open side and smaller in width than said open side and two sides which converge from each longitudinal edge of said open side toward said opposite side; an air distribution conduit mounted lengthwise of and within said housing and having a plurality of apertures spaced lengthwise of and facing said open side of said housing; an air supply conduit having one end secured to said housing and communicating with one end of said distribution conduit and its opposite end connected to and communicating with means for supplying air at high velocity; and an exhaust conduit secured to the side of said housing opposite said open side and disposed intermediate the ends of said housing and spaced from said distribution conduit so that air impinged on said web is removed from said housing annularly of said distribution conduit through said exhaust conduit.

References Cited

UNITED STATES PATENTS

| | | | |
|---|---|---|---|
| 1,867,405 | 7/1932 | Gurwick | 101—152 |
| 2,659,162 | 11/1953 | Katz | 34—122 |
| 3,060,594 | 10/1962 | Meier-Windhorst | 34—160 |
| 3,134,653 | 5/1964 | Justus et al. | 34—160 XR |
| 3,136,654 | 6/1964 | Craver | 117—119.8 |
| 3,151,954 | 10/1964 | Ege | 34—155 |
| 3,199,222 | 8/1965 | Hultgreen | 34—155 |

KENNETH W. SPRAGUE, *Primary Examiner.*